(12) United States Patent
Boston et al.

(10) Patent No.: US 9,255,583 B2
(45) Date of Patent: Feb. 9, 2016

(54) PROPELLER HUB HAVING A REINFORCED POLYGONAL RING AND TURBINE ENGINE PROVIDED WITH SUCH A HUB

(75) Inventors: Eric Jacques Boston, Cesson (FR); Michel Andre Bouru, Montereau sur le Jard (FR); Laurent Jablonski, Melun (FR); Philippe Gerard Edmond Joly, Vauz le Penil (FR)

(73) Assignee: SNECMA, Paris (FR)

( * ) Notice: Subject to any disclaimer, the term of this patent is extended or adjusted under 35 U.S.C. 154(b) by 917 days.

(21) Appl. No.: 13/513,979

(22) PCT Filed: Dec. 6, 2010

(86) PCT No.: PCT/EP2010/069008
§ 371 (c)(1),
(2), (4) Date: Jun. 5, 2012

(87) PCT Pub. No.: WO2011/069981
PCT Pub. Date: Jun. 16, 2011

(65) Prior Publication Data
US 2012/0257975 A1 Oct. 11, 2012

(30) Foreign Application Priority Data

Dec. 7, 2009 (FR) ..................................... 09 58699
Dec. 7, 2009 (FR) ..................................... 09 58700

(51) Int. Cl.
*F01D 7/00* (2006.01)
*F04D 29/32* (2006.01)
(Continued)

(52) U.S. Cl.
CPC .............. *F04D 29/329* (2013.01); *B64C 11/06* (2013.01); *B64C 11/48* (2013.01); *B64D 2027/026* (2013.01); *Y02T 50/66* (2013.01)

(58) Field of Classification Search
CPC .......... B64C 11/06; B64C 11/46; B64C 11/48
See application file for complete search history.

(56) References Cited

U.S. PATENT DOCUMENTS 1,118,374 A * 11/1914 Silverston ..................... 416/129
4,422,828 A * 12/1983 Sambell ........................ 416/135
(Continued)

FOREIGN PATENT DOCUMENTS

DE 40 17 586 12/1990
EP 0 267 097 5/1988
(Continued)

OTHER PUBLICATIONS

International Search Report Issued Feb. 4, 2011 in PCT/EP10/69008 Filed Dec. 6, 2010.

*Primary Examiner* — Richard Edgar
*Assistant Examiner* — Brian O Peters
(74) *Attorney, Agent, or Firm* — Oblon, McClelland, Maier & Neustadt, L.L.P.

(57) ABSTRACT

A variable pitch blade propeller hub for a turbomachine with a longitudinal axis includes a polygonal ring supporting the blades, concentric with the longitudinal axis and including two spaced parallel annular end flanges between which are diametrically fastened, by root areas arising from the annular flanges, collars with cylindrical radial housings to receive the blades. The collars are equi-angularly distributed at the lateral periphery of the polygonal ring and separated from each other by intermediate areas with through-openings. The also includes connectors connecting the polygonal ring to a turbine rotor element of the turbomachine. The intermediate areas defined between two concentric collars and the annular end flanges include elements for reinforcing the collars that are arranged radially and/or tangentially and fastened at least to the lateral walls of two consecutive collars.

20 Claims, 5 Drawing Sheets

(51) Int. Cl.
  *B64C 11/06* (2006.01)
  *B64C 11/48* (2006.01)
  *B64D 27/02* (2006.01)

(56) References Cited

U.S. PATENT DOCUMENTS

| | | | |
|---|---|---|---|
| 4,762,466 A | | 8/1988 | Bouiller et al. |
| 4,863,352 A | * | 9/1989 | Hauser et al. ............ 416/204 R |
| 5,082,424 A | | 1/1992 | Husain et al. |
| 5,112,191 A | | 5/1992 | Strock et al. |
| 5,152,668 A | * | 10/1992 | Bulman et al. ................ 416/129 |
| 5,224,831 A | | 7/1993 | Hermans et al. |
| 5,263,898 A | | 11/1993 | Elston, III et al. |

FOREIGN PATENT DOCUMENTS

| | | |
|---|---|---|
| FR | 2 641 251 | 7/1990 |
| FR | 2 645 499 | 10/1990 |
| GB | 2 226 087 | 6/1990 |

\* cited by examiner

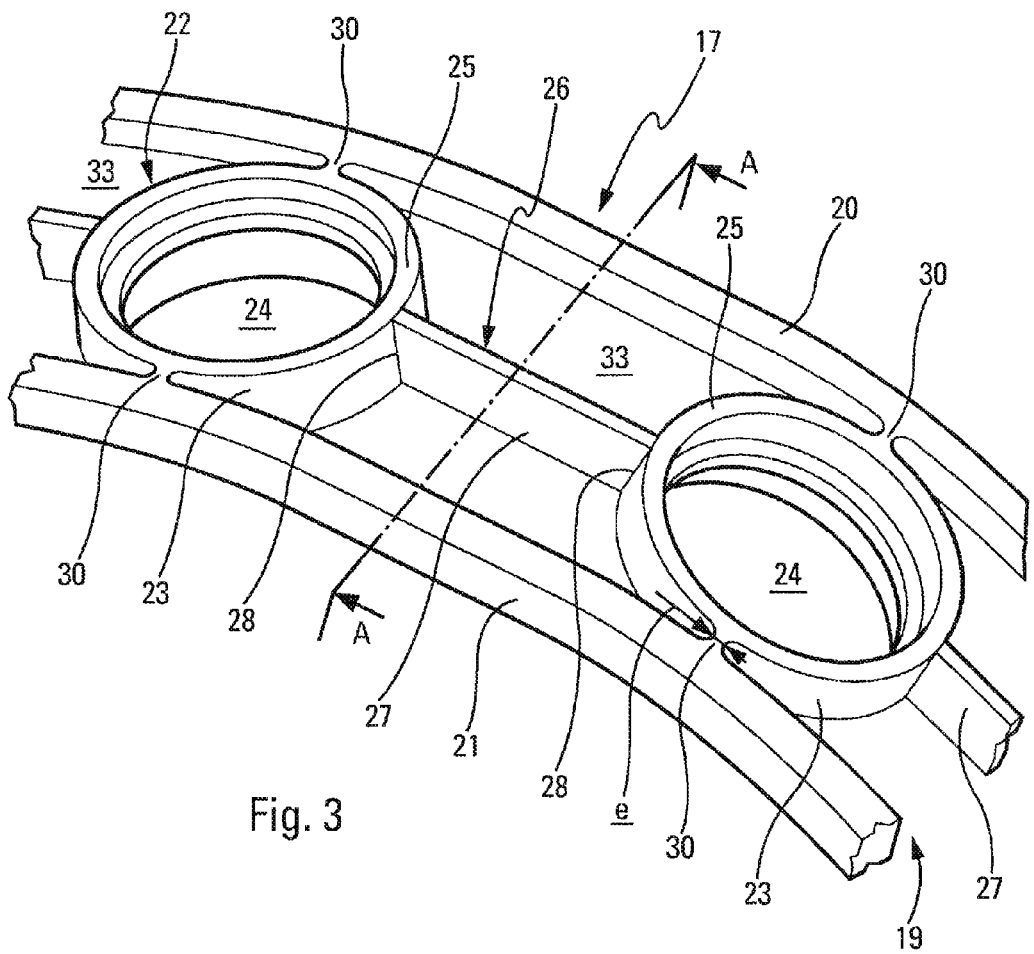
Fig. 3
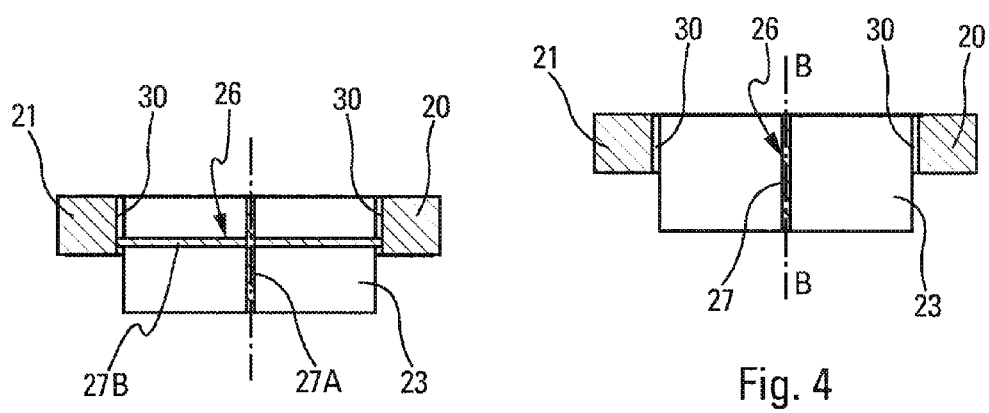
Fig. 8
Fig. 4

PROPELLER HUB HAVING A REINFORCED POLYGONAL RING AND TURBINE ENGINE PROVIDED WITH SUCH A HUB

BACKGROUND OF THE INVENTION

1. Field of the Invention

The present invention concerns a variable pitch blade propeller hub for a turbomachine of the unducted fan ("open rotor") type.

2. Description of the Related Art

The fan of a turbomachine of this type typically comprises two contrarotating coaxial external propellers, respectively upstream and downstream, each of which is driven in rotation by a turbine of the turbomachine and extends substantially radially outside the nacelle of the turbomachine.

Each propeller usually comprises a hub of the type including a polygonal ring to support said blades, concentric with the longitudinal axis of the turbomachine and composed of two parallel annular end flanges between which are diametrically fastened, by root areas arising from the annular flanges, collars with cylindrical radial housings to receive said blades. The collars are equi-angularly distributed on the lateral periphery of the polygonal ring and separated from each other by plane intermediate areas with through-openings or orifices, and connecting means connect the polygonal ring to a turbine rotor element of the turbomachine.

The blades can turn in the housings of the collars of the polygonal ring and to this end are driven in rotation about the axes of the blades by appropriate means to adjust the angular pitch of the blades and to optimize it as a function of the operating conditions of the turbomachine.

In operation, the rotating parts of the turbomachine, and notably the hub and the blades of the propeller, are subjected, to various degrees, to high loads of mechanical, thermal, aerodynamic, etc. type. In particular, the cylindrical housings of the blades tend to be deformed by the high forces that are exerted at the level of the radial collars of the polygonal ring, until they assume an oval configuration. As the root areas connecting the collars to the annular flanges are wide and extend over a large peripheral portion of the collars for reasons of mechanical strength and stiffness, the traction forces exerted by these flanges on the collars cause them to assume an oval shape. Thus there is a risk that the raceways of the bearings that are provided between the cylindrical housing of each collar and a rotary device (notably a plate and crown device) carrying the blade and enabling the pitch thereof to be varied, may deteriorate rapidly, to the point of no longer guaranteeing correct functioning of the blades, with the consequences to which this may lead.

Moreover, to reduce the mass of the polygonal ring, which may have a diameter greater than one meter, the intermediate areas of the lateral periphery of the ring are provided with through-openings formed alternatively and consecutively between the collars with radial housings receiving the blades. As a result, there is a significant saving in mass without this compromising the mechanical characteristics of the polygonal ring.

Moreover, the use of composite materials is constantly expanding, again to lighten the parts and also for reasons of stiffness and longevity. Also, the propeller blades are advantageously manufactured from these composite materials.

It has nevertheless been noticed that, in operation, the roots of the blades, connected to the exterior side of the polygonal ring, as opposed to its interior side facing toward the turbines, are subjected to relatively high temperatures caused notably by the flow of hot air in the turbine element cooling circuit. Some of this hot air passes through the through-openings in the intermediate areas of the polygonal ring and flow around the roots of the blades, heating them. The composite materials of the blades are incompatible with these temperatures. Moreover, the combustion gases passing coaxially through the turbomachine contribute to maintaining these high temperature levels, notably by conduction via the parts themselves, despite the presence of the cooling circuits.

BRIEF SUMMARY OF THE INVENTION

An object of the present invention is to remedy these drawbacks and the present invention concerns a variable pitch blade propeller hub in which the design of said polygonal ring notably guarantees the absence of deformation of the cylindrical housings of the collars.

To this end, the variable pitch blade propeller hub for a turbomachine with a longitudinal axis, of the type including:
  a polygonal ring supporting the blades, concentric with the longitudinal axis and composed of two spaced parallel annular end flanges between which are diametrically fastened, by root areas arising from said annular flanges, collars with cylindrical radial housings to receive the blades, said collars being equi-angularly distributed at the lateral periphery of the polygonal ring and separated from each other by intermediate areas with through-openings, and
  connecting means connecting the polygonal ring to a turbine rotor element of the turbomachine, is noteworthy, according to the invention, in that the intermediate areas defined between two consecutive collars and the annular end flanges include elements for reinforcing the collars that are arranged radially and/or tangentially and fastened at least to the lateral walls of two consecutive collars.

In one embodiment, when they are arranged radially, substantially parallel to said annular end flanges, the reinforcing elements each take the form of a thin rigid plate disposed radially in the through-opening of the intermediate part and fastened by its lateral edges to the corresponding lateral walls of two consecutive collars.

Accordingly, thanks to the invention, the radial plate reinforcing elements constitute stiffening ribs which, because of their disposition between two consecutive collars, perpendicularly to the diametrical connection thereof to the end annular flanges via the root areas, prevent said collars and thus the cylindrical radial housings from assuming an oval shape because of the loads exerted. The latter loads are thus absorbed without deformation of the collars. And the raceways of the bearings provided on the rotary devices of the blades retain their integrity.

The simplicity of producing the reinforcing elements will also be noted which, apart from preventing deformation of the collars, does not lead to any significant increase in the weight of the ring (thin plates), justifying the presence of the through-openings in the latter, all the more so in that the root areas are small.

Said root areas of the annular end flanges on the collars may advantageously have a small thickness because of the presence of said reinforcing elements. Thus even if this leads to less opposition to the pendular movement caused by the blades, the risk of deformation at the level of the thin root areas is eliminated by the reinforcing elements that oppose this pendular movement and prevent the collars from assuming an oval shape. For example, the thickness of the root areas is of substantially the same order as that of said reinforcing elements or that of said collars.

The reinforcing elements with plates of the collars are preferably situated in the median radial plane of said polygonal ring, perpendicular to the longitudinal axis and containing the geometrical axes of the cylindrical radial housings receiving the blades, and equidistant from the two annular end flanges of the polygonal ring. Thus each collar is held rigidly by four mutually perpendicular connections (two with the root areas of the annular end flanges, two with the reinforcing elements of the collars), conferring a satisfactory stiffness on each of the collars. Thus the reinforcing elements form a disk stiffening the collars, preventing their housing assuming an oval shape.

Said reinforcing plate elements advantageously extend radially the full height of said collars. As a result, the objective of reducing as much as possible the deformation of the housings of the collars and increasing their resistance to operating forces is achieved.

In another embodiment, when they are arranged tangentially, the reinforcing elements block the through-openings in the intermediate areas defined between said consecutive collars and said annular end flanges, said lateral periphery of said polygonal ring being substantially solid and continuous.

Accordingly, communication is prevented between the interior side of said polygonal ring facing towards said turbomachine and the exterior side facing towards said blades.

Thanks to the closed design of the lateral periphery of said ring, the cooling circuits are channeled and confined on the interior side of the polygonal ring and thus flowing toward the downstream end of the turbomachine without passing through the latter. As a result, blades with composite material roots may be used entirely safely, for their numerous advantages and to prevent deterioration of the roots.

In a preferred embodiment, the tangential reinforcing elements each take the form of a thin material web, the set of said webs blocking said lateral periphery of said polygonal ring. This embodiment thus enables the increase in the mass of said polygonal ring to be minimized at the same time as separating the flow of the hot gases between the interior side of the polygonal ring and the exterior side thereof carrying the composite blades.

In particular, said thin webs are situated substantially in the middle of the thickness of the polygonal ring.

Said root areas arising from the annular end flanges and diametrically connecting the collars advantageously have a small thickness. The small thickness of these areas corresponds substantially to that of the collars, for example.

Accordingly, the webs provided in the intermediate areas of the lateral wall of the ring not only serve as a heat shield vis a vis the blade roots but also serve as stiffeners vis a vis the collars and the root areas.

The latter areas are usually wide and extend over a large peripheral portion of the collars for reasons of mechanical strength and stiffness, with the result that the traction forces exerted by these flanges on the collars may cause them to assume an oval shape. Consequently, there is a risk that the raceways of the bearings which are provided between the cylindrical housing of each collar and a rotary device carrying the blade and enabling the pitch of the latter to be varied may deteriorate rapidly, to the point of no longer guaranteeing correct functioning of the blades, with the consequences to which that may lead.

Reducing the extent (thickness) of these root areas reduces the influence of the traction forces, eliminating the risk of the collars assuming an oval shape; this also reduces the risk of deformation of the root areas that may be generated by the reduced opposition of the latter to the pendular movement caused by the blades, being countered by the tangential webs arranged in the intermediate areas at the lateral periphery of said ring.

In a further embodiment each reinforcing element takes the form of two perpendicular thin rigid plates defining a cruciform cross section, one plate being arranged radially in the through-opening and connecting the corresponding two collars and the perpendicular other plate being arranged tangentially at the lateral periphery of the polygonal ring and connecting the annular end flanges of the ring to block the through-opening.

Thus not only is the stiffness of the collars further increased, eliminating their deformation, but also, with the closure of the through-openings, some of the cooling hot gases flowing in the nozzles of the turbomachine are prevented from passing through the openings from the interior side of the ring, where the turbines are located, to the exterior side, where the blades of the propeller are located, and from overheating the roots of the blades, which are sensitive to high temperatures given that they are produced in composite material.

The reinforcing elements, whether radial and/or tangential, are preferably integral with the polygonal ring. The whole of the latter is thus obtained directly, in one piece, by rolling and machining techniques. Obviously, said reinforcing elements may also be fixedly attached to the completed polygonal ring.

The invention also concerns a turbomachine of the unducted fan type. It advantageously includes a propeller hub of said fan as defined above.

BRIEF DESCRIPTION OF THE SEVERAL VIEWS OF THE DRAWINGS

The figures of the appended drawings show how the invention may be reduced to practice. In these figures, identical references designate similar elements.

FIG. 3 is a partial view to a larger scale of the polygonal ring from FIG. 2, showing the thin plate radial reinforcing elements for the blade support collars.

FIG. 4 is a cross section taken along the line A-A in FIG. 3 of the reinforcing element.

FIG. 8 shows, in cross section analogous to FIG. 4, a different embodiment of said reinforcing element that is both radial and tangential.

DETAILED DESCRIPTION OF THE INVENTION

Figure 1:
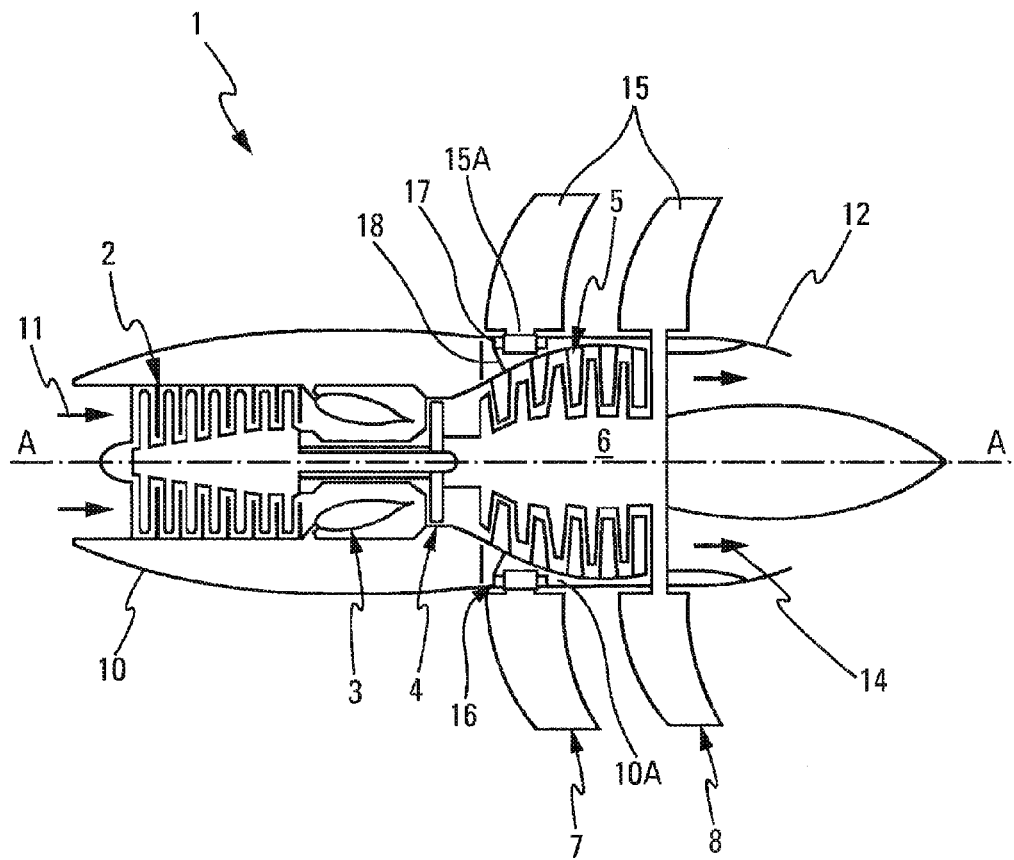
FIG. 1 is a diagrammatic view in longitudinal section of a turbomachine of the unducted fan type.

Refer first to FIG. 1 which represents an unducted fan ("open rotor") turbomachine 1 that includes, in the upstream to downstream direction, in the direction of flow of the gases inside the turbomachine, which has a longitudinal axis A, a compressor 2, an annular combustion chamber 3, a high-pressure turbine 4, and two low-pressure turbines 5, 6 that contrarotate, i.e. turn into opposite directions about the longitudinal axis A of the turbomachine.

Each of these downstream turbines 5, 6 is constrained to rotate with an external propeller 7, 8 extending radially outside the nacelle 10 of the turbomachine, this nacelle 10 being substantially cylindrical and extending along the axis A around the compressor 2, the combustion chamber 3 and the turbines 4, 5 and 6.

The airflow 11 that enters the turbomachine is compressed and then mixed with fuel and burned in the combustion chamber 3, the combustion gases then passing through the turbines to drive rotation of the fans 7, 8 that furnish the greater part of the thrust generated by the turbomachine. The combustion gases leaving the turbines are expelled via a nozzle 12 (arrow 14) to increase the thrust.

The propellers 7, 8 are placed coaxially one behind the other and include a plurality of blades 15 regularly distributed around the longitudinal axis A of the turbomachine 1. These blades 15 extend substantially radially and are of the variable pitch type, i.e. they are able to turn about their axis to optimize their angular position as a function of the operating conditions of the turbomachine.

In a known arrangement, described notably in the document U.S. Pat. No. 5,263,898, each propeller 7, 8 comprises a rotary hub or rotor element 16 formed principally by a polygonal ring 17 supporting the blades 15 and disposed concentrically with the longitudinal axis A of the turbomachine 1 and perpendicularly thereto. For example, on the upstream propeller 7 represented in FIGS. 1 and 2, the polygonal ring 17 of the hub 16 is located in the corresponding rotary part 10A of the nacelle 10 and is connected thereto by appropriate connecting means 18 represented symbolically in FIG. 1.

This polygonal ring 17 that supports the blades 15 is generally of one-piece construction and its lateral periphery 19 is composed of two parallel annular polygonal end flanges (or parts) 20 and 21 connected to each other by intermediate cylindrical parts 22, such as radial collars (or bushes) 23. These are equi-angularly distributed on the resulting lateral periphery 19 of the ring 17 and the lateral walls 25 of the collars define cylindrical radial housings 24 the axes B whereof converge in the same radial plane toward the longitudinal axis A of the turbomachine 1 and which are intended to receive blade mounting devices 29.

These mounting devices 29 are more particularly shown diagrammatically and externally in FIG. 2 and are described in detail with reference to the document U.S. Pat. No. 5,263, 898, for example. Briefly, each device 29 carries the root 15A of the blade 15 on one side and is engaged on the other side in the housing 24 of the collar 23. Bearings, not shown, provided in the housing enable rotation, via appropriate means, not shown, of the mounting device relative to the housing of the ring. Accordingly, the pitch of the blades may be modified as a function of the speed and the flight phases of the aircraft by overall control of the blade rotation means.

Figure 2:
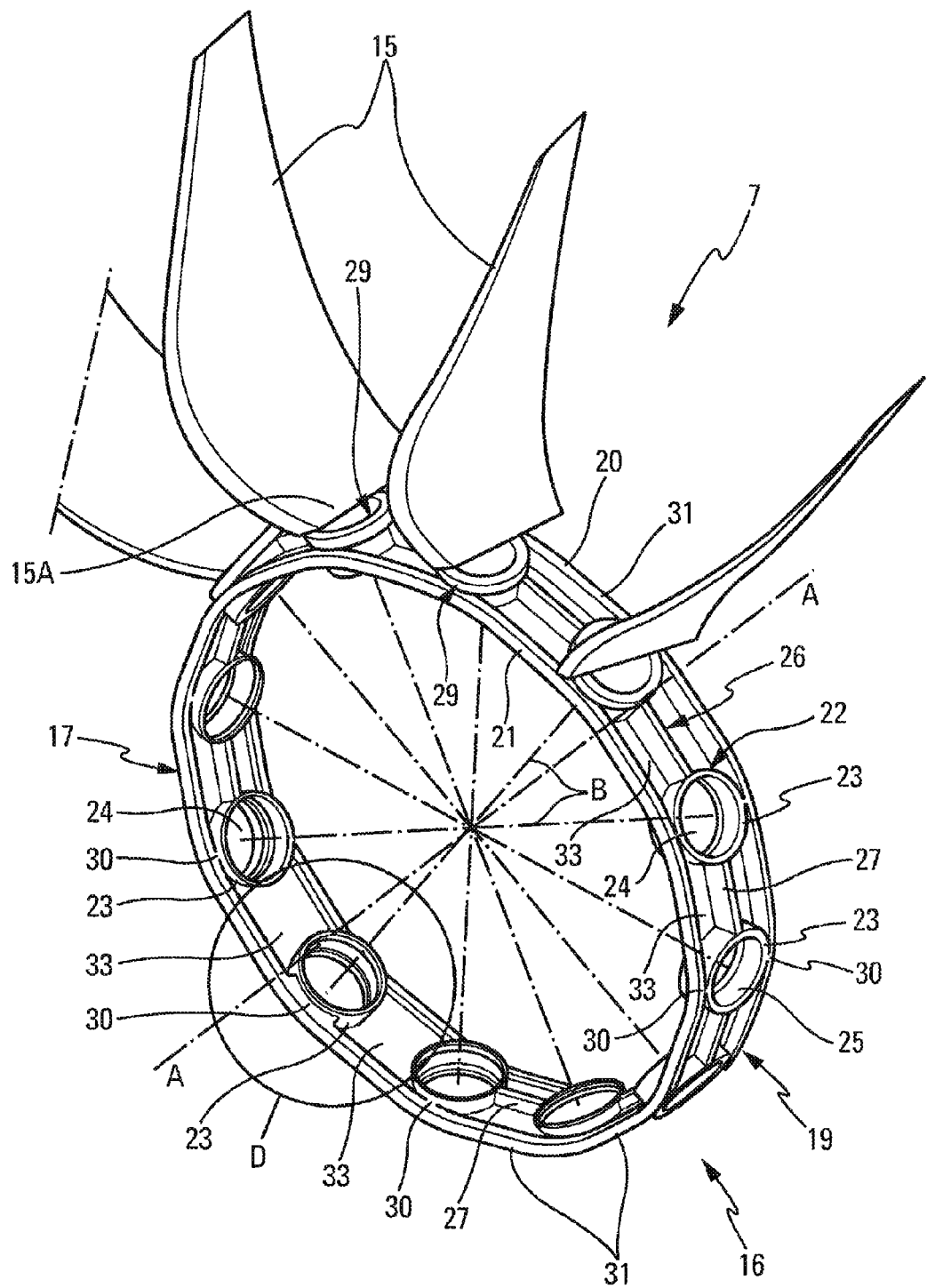
FIG. 2 is a partial perspective view of the upstream propeller of said turbomachine, with its polygonal hub ring carrying the blades of the propeller and equipped with radial reinforcing elements.

Moreover, as seen in FIGS. 2 and 3, the lateral walls 25 of the cylindrical collars 23 are fastened to the annular end flanges 20, 21 by root or connecting areas 30 provided in diametrically opposite positions on the lateral periphery 19 of the polygonal ring 17 and having a height that is preferably identical to that of the annular end flanges. Note moreover, in FIG. 2, that the housings 24 receiving the mounting devices 29 of the blades 15 are situated at the intersections of the plane areas 31 (of which there are twelve in this example) of the polygonal lateral periphery 19 of the ring, which is manufactured in one piece, notably by appropriate rolling and machining techniques.

Also, to lighten the polygonal ring 17, the plane areas between two consecutive collars have through-openings or orifices 33 delimited by the lateral walls 25 of the consecutive collars and by the corresponding portions of the annular end flanges 20, 21 of the ring. These openings 33 thus alternate with the collars 23 at the lateral periphery 19 of the polygonal ring forming the hub 16 of the propeller. Two of these through-openings 33, as in production at present, are shown in the detail D of FIG. 2, with the root areas 30 (only one of which is visible) fastening the collar 23 diametrically to the annular flanges 20, 21. It is seen that the thickness or width of the area represented is large, leading, as mentioned above, to the collar assuming an oval shape because of the traction forces exerted on it by these flanges.

According to the invention, reinforcing elements 26 are provided in the through-openings 33 to prevent deformation of the collars 23 and notably to prevent them assuming an oval shape because of the intense forces that are exerted on them. To this end, in the embodiment illustrated by FIGS. 2 to 4, the reinforcing elements 26 are disposed radially and are rigidly associated with the lateral walls 25 of two consecutive collars 23, engaging these lateral walls perpendicularly to the diametrical root areas 30 of the collars 25 on the annular end flanges 20, 21 of the ring, i.e. where there is a high risk of assuming an oval shape. Note that, in contrast to the prior art wide root areas 30 as shown in the enlargement D in FIG. 2, the other areas 30 of the ring have a small thickness e (FIG. 3), of the same order as that of the collars or the reinforcing elements, which greatly reduces the forces exerted by the flanges on the collars 23 and thus their tendency to assume an oval shape. Also, the reinforcing elements 26 oppose the pendular movement caused by the blades, with the risk of amplification thereof by the reduced extent e of the root areas 30, and eliminate the risk of deformation at the level of the root areas, which are then smaller, by contributing to stiffening the collars.

In this embodiment, the reinforcing elements 26 are defined by thin rigid plates 27 each disposed in a through-opening 33 and situated in the median radial plane of the polygonal ring 17, that is to say, as shown in FIGS. 2 and 4, the plane perpendicular to the longitudinal axis A of the turbomachine and containing the geometrical axes B of the cylindrical housings 24 receiving the blades, equidistant from the two annular end flanges 20, 21 of the ring. As seen in FIGS. 2 and 3, the thin rigid plates 27 disposed radially in this way prevent deformation of the thin root areas and the lateral walls 25 of the collars 23, notably of the raceways of the bearings in which the blades rotate. The set of these thin plates 27 thus defines a force absorbing disk formed of a plurality of stiffener ribs. To prevent deformation, each rigid thin plate 27 extends the full height of the collars 23, the lateral edges 28 of the plates being fastened to the walls 25 of the collars.

Accordingly, by virtue of the arrangement of these reinforcing elements 26 and the thin areas 30, the prevention of deformation of the housings of the collars and the resistance of the collar in general to the various operating forces are reinforced, in the end avoiding deterioration of the raceways of the bearings provided between the housings of the collars and the rotary mounting devices 29 since the lateral wall 25 of each collar 23 is "supported" by four perpendicular connections (two connecting areas 30 and two reinforcing elements 26).

Moreover, the fact of adding thin plates 27 to eliminate the risk of deformation of the small root areas and to stiffen the collars does not contribute to any significant increase in the mass of the hub 16 of the propeller 7, all the more so in that the root areas 3 are small.

As mentioned above, the polygonal ring 17 is produced directly by appropriate techniques so that the annular end flanges 20, 21, the collars 23 and the reinforcing elements 26 constitute one and the same part. However, assembling by welding or otherwise the thin rigid plates between the lateral walls of the collars could be envisaged.

Figure 6:
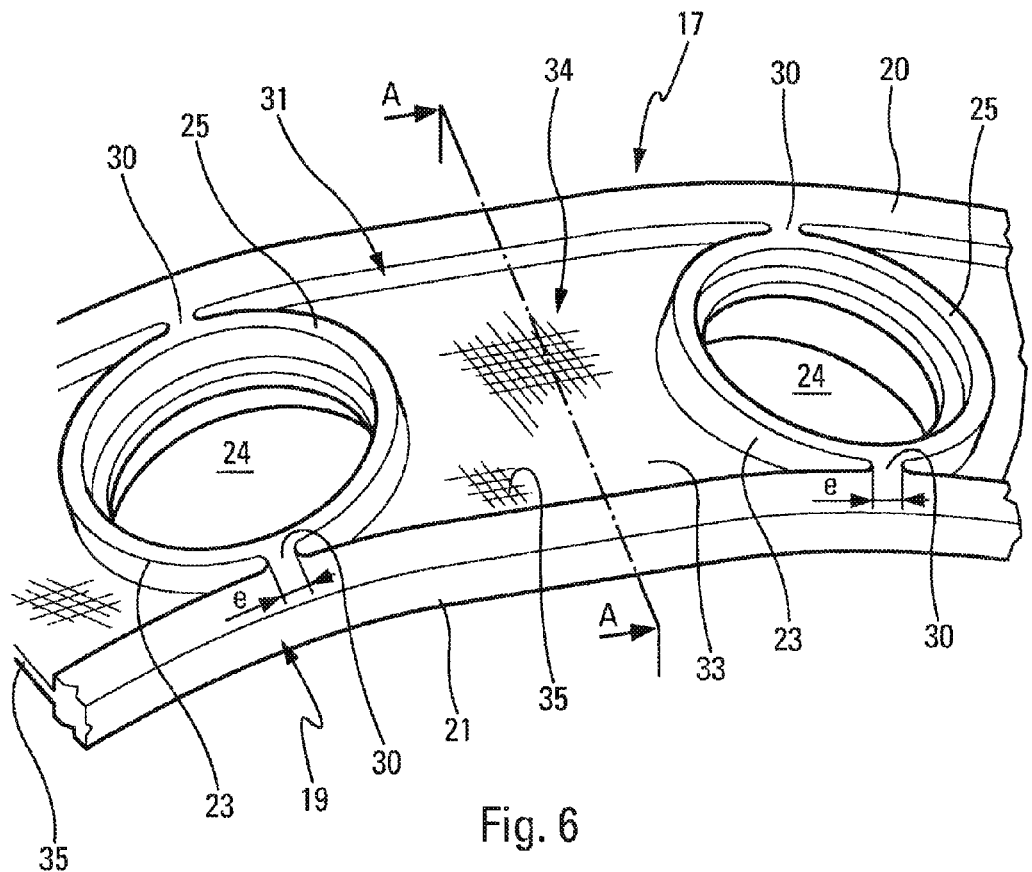
FIG. 6 is a partial view to a larger scale of the ring of the hub from FIG. 5, without the corresponding blades and showing the tangential material web reinforcing element connecting the collars with housings for receiving the blades.
Figure 7:
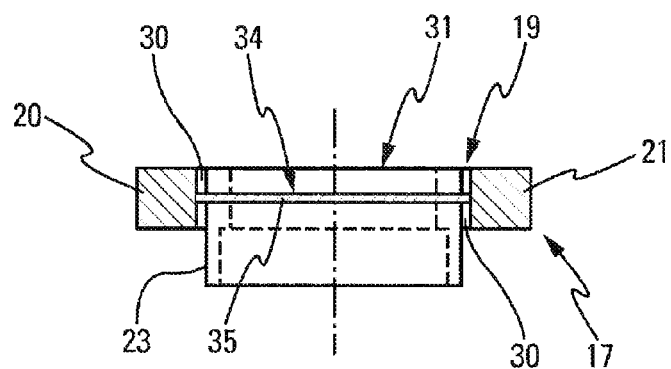
FIG. 7 is a radial section taken along the line A-A in FIG. 6 of said polygonal ring.

Another embodiment of the reinforcing elements 26 will be described hereinafter with reference to FIGS. 5 to 7. Note first that the blade mounting devices 29 are identical to those of the previous embodiment. Briefly, to each device their corresponds a plate 29A that carries on one side, via a pin articulation, a mortise-and-tenon or other connection, the root 15A of the blade 15, while its other side is engaged from the exterior of the polygonal ring in the housing 24 of the collar 23. A crown part 29B is also mounted in the housing 24, but from the interior of the polygonal ring 17, to be fixed to the plate and to immobilize the latter axially, and bearings, not shown, provided in the housing, between the plate and the crown, enable the rotation, by appropriate means, not shown, of the plate relative to the housing of the polygonal ring to modify the pitch of the blades.

The lateral walls 25 of the cylindrical collars 23 are fastened to the annular end flanges 20, 21 via the root or connecting areas 30 provided at diametrically opposite positions on the lateral periphery 19 of the polygonal ring 17. The height of these areas 30 is preferably identical to that of the annular end flanges. It is moreover seen in FIG. 5 that the housings 24 of the mounting devices 29 receiving the blades 15 are, as before, situated at the intersections of the intermediate plane areas 31 constituting the polygonal lateral periphery 19 of the collar. The latter is made in one piece, notably by appropriate rolling and machining techniques.

Figure 5:
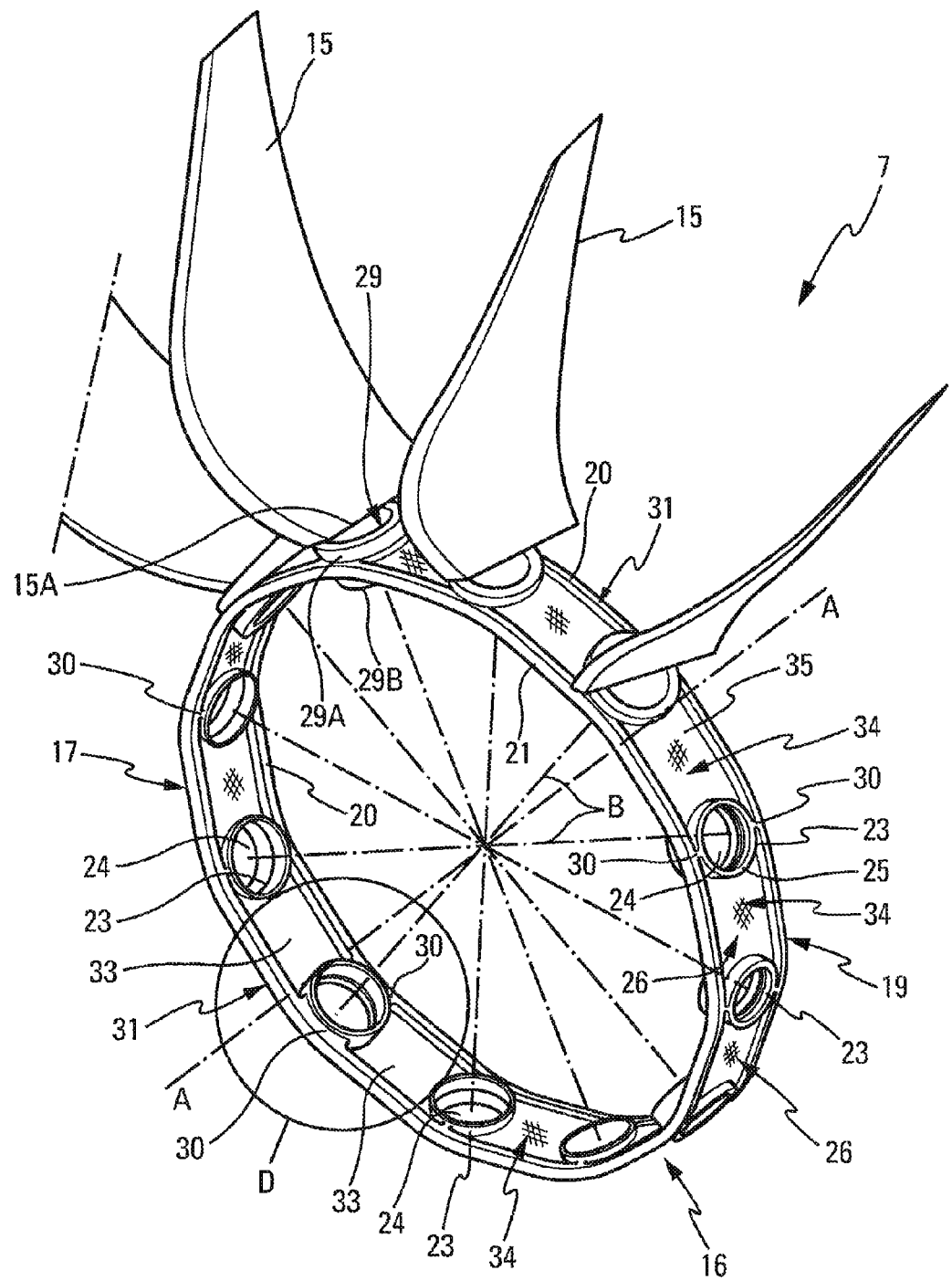
FIG. 5 is a partial perspective view of the upstream propeller of the turbomachine, with its polygonal hub ring carrying the blades of the propeller and equipped with tangential reinforcing elements.

Although in the previous embodiments shown partly in the detail D in FIG. 5, the intermediate plane areas 31 of the lateral periphery 19 of the polygonal collar comprise through-openings or orifices 33, where there is no material, between the annular end flanges 20, 21 and the cylindrical collars 23, these intermediate plane areas 31 are solid and continuous. To this end, the openings 33 are provided with reinforcing elements 26 which, in this embodiment, are tangential and each take the form of a material web or sheet 34 with a thin wall 35, as FIGS. 5 to 7 show. The set of these webs 34 with thin walls 35 thus constitutes, at the lateral periphery 19 of the polygonal ring, a tangential separation partition between the interior side of the polygonal ring 17, which faces towards the turbines 5, 6 of the turbomachine 1, and the exterior side which, for its part, faces towards the blades 15 of the propeller 7. It is thus clear that this separating partition enables channeling and thus thermal isolation of the flow of hot gases of the cooling circuits of the low-pressure turbine 5 by preventing it from passing, as before, through the through-openings and overheating the roots 15A of the blades 15 of the propeller, particularly when the latter are made in composite material, much more sensitive to heat than metals.

Apart from the fact of channeling the hot cooling flow, appropriate cooling of the roots of the blades of the propeller may be obtained by the air in the boundary layer.

Thus the roots of the blades are maintained at an adequate temperature at the level of the exterior of the polygonal ring 17, without leading to heating thereof.

From the structural point of view, the material webs 34 are produced directly during the production of the polygonal ring 17. They could of course be attached subsequently. It is seen, notably in FIG. 4, that the material web 34 has a minimum thickness so as not to contribute to increasing the mass of the polygonal ring.

Although the reinforcing elements 26 with thin webs 34 are situated substantially in the middle of the thickness of the polygonal annular 17, they could of course, without departing from the scope of the invention, be at a different location, between the exterior and interior sides of the polygonal ring.

It is also seen, as before, in the FIG. 5 detail D, that the root areas 30 are relatively thick, covering a significant peripheral portion of the collars. On the other hand, with the arrangement of the webs 34 in the intermediate areas 31, the root areas 30 have a small thickness e (FIGS. 2 and 3), slightly enlarging the intermediate areas. The thickness e may be of the same order as that of the lateral wall of the collars. As stated above, reducing the thickness of the root areas leads notably to reducing the influence of the traction forces exerted by the flanges on the collars and thus to eliminating the risk of the latter assuming an oval shape, and the opposition to the pendular movement caused by the blades, with the risk of deforming the root areas, which are then small, is countered by the presence of the tangential webs 34 which block and stiffen the lateral periphery of the polygonal ring.

Alternatively, in a different embodiment, each reinforcing element 26 could have a cruciform cross section, in the manner represented in FIG. 8, for example. A first rigid thin plate 27A is thus disposed in exactly the same way as in the previous embodiment of FIGS. 2 to 4, while a second thin plate 27B serving as a web, perpendicular to the first and arising from each side thereof, extends tangentially into the corresponding through-opening 33 until it comes up against the annular end flanges 20, 21 and the wall of the collars 23, as in the embodiment of FIGS. 5 to 7.

Accordingly, the through-openings 33 at the lateral periphery 19 of the polygonal ring 17 are totally blocked, the set of cruciform reinforcing elements 26 contributing to further stiffening of the collars and the annular 17 in general, and also to thermally isolating the exterior side of the hub 16, where the blades 15 are located, from the interior side, where the turbines are located. Accordingly, the flow of cooling hot gases flowing in the turbomachine is channeled from the interior side of the hub with its polygonal ring and no longer passes through the through-openings, with the risk of causing overheating of the root of the blades of the propeller, which is particularly critical if the latter are made from composite material.

The invention claimed is:

1. A variable pitch blade propeller hub for a turbomachine with a longitudinal axis, comprising:
    a polygonal ring supporting a plurality of blades, the polygonal ring being concentric with the longitudinal axis and including two spaced parallel annular end flanges to which are diametrically fastened by root areas arising from said annular flanges a plurality of collars, each of the collars having a cylindrical radial housing to receive one of the blades, said collars being equi-angularly distributed at a lateral periphery of the polygonal ring and separated from each other by intermediate areas with through-openings between any two adjacent collars,
    wherein reinforcing elements are provided in the through-openings of the intermediate areas defined between any two adjacent collars and the annular end flanges, the reinforcing elements reinforce the collars and are fastened to a lateral wall of two adjacent collars.

2. The hub as claimed in claim 1, wherein said reinforcing elements are arranged radially and substantially parallel to said annular end flanges, each reinforcing element including a thin rigid plate disposed radially in the through-opening and fastened by lateral edges thereof to corresponding lateral walls of two adjacent collars.

3. The hub as claimed in claim 2, wherein said root areas of the annular end flanges on the collars have a small thickness of substantially same order as that of said reinforcing elements or that of said collars.

4. The hub as claimed in claim 2, wherein the reinforcing elements are situated in a median radial plane of the polygonal ring, perpendicular to the longitudinal axis and containing geometrical axes of the cylindrical radial housings receiving the blades, and equidistant from the two annular end flanges of the polygonal ring.

5. The hub as claimed in claim 2, wherein the reinforcing elements extend radially over a full height of said collars.

6. A turbomachine of the unducted fan type, comprising at least one propeller hub as defined in claim 1.

7. The hub as claimed in claim 1, wherein said root areas arising from the annular flanges and diametrically connecting the collars have a small thickness of substantially same order as that of said collars.

8. The hub as claimed in claim 1, wherein said reinforcing elements are integral with said polygonal ring or fixedly attached to the polygonal ring.

9. A variable pitch blade propeller hub for a turbomachine with a longitudinal axis, comprising:
a polygonal ring supporting a plurality of blades, the polygonal ring being concentric with the longitudinal axis and including two spaced parallel annular end flanges to which are diametrically fastened by root areas extending axially said annular flanges a plurality of collars at upstream and downstream walls thereof, each of the collars having a cylindrical radial housing to receive one of the blades, said collars being equi-angularly distributed at a lateral periphery of the polygonal ring and separated from each other by intermediate areas between any two adjacent collars,
wherein reinforcing elements are provided in the intermediate areas defined between any two adjacent collars and the annular end flanges, the reinforcing elements reinforcing the collars and are fastened to a lateral wall of two adjacent collars,
wherein the reinforcing elements are arranged tangentially in the intermediate areas defined between said adjacent collars and said annular end flanges.

10. The hub as claimed in claim 9, wherein said root areas arising from the annular flanges and diametrically connecting the collars have a small thickness of substantially same order as that of said collars.

11. The hub as claimed in claim 9, wherein a thickness of the root areas is substantially equal to a thickness of the collars.

12. The hub as claimed in claim 11, wherein the reinforcing elements include a thin material web.

13. The hub as claimed in claim 12, wherein said thin webs are situated substantially in a middle of a thickness of said polygonal ring.

14. A turbomachine of the unducted fan type, comprising at least one propeller hub as defined in claim 9.

15. A variable pitch blade propeller hub for a turbomachine with a longitudinal axis, comprising:
a polygonal ring supporting a plurality of blades, the polygonal ring being concentric with the longitudinal axis and including two spaced parallel annular end flanges to which are diametrically fastened by root areas extending axially from said annular flanges a plurality of collars at upstream and downstream walls thereof, each of the collars having a cylindrical radial housing to receive one of the blades, said collars being equi-angularly distributed at a lateral periphery of the polygonal ring and separated from each other by intermediate areas between any two adjacent collars,
wherein reinforcing elements are provided in the intermediate areas defined between any two adjacent collars and the annular end flanges, the reinforcing elements reinforcing the collars and are fastened to a lateral wall of two adjacent collars,
wherein each reinforcing element includes first and second thin rigid plates perpendicular to each other and defining a cruciform cross section, the first plate being arranged radially in said intermediate area and connecting the corresponding two collars and the second plate perpendicular thereto being arranged tangentially at the lateral periphery of the polygonal ring and connecting said annular end flanges of the collar to extend between the flanges.

16. The hub as claimed in claim 15, wherein said reinforcing elements are integral with said polygonal ring or fixedly attached to the polygonal ring.

17. The hub as claimed in claim 15, wherein a thickness of the root areas is substantially equal to a thickness of the collars.

18. The hub as claimed in claim 15, wherein said root areas arising from the annular flanges and diametrically connecting the collars have a small thickness of substantially same order as that of said collars.

19. The hub as claimed in claim 15, wherein the first plate extends radially over a full height of said collars.

20. A turbomachine of the unducted fan type, comprising at least one propeller hub as defined in claim 15.

* * * * *